(12) United States Patent
Mead et al.

(10) Patent No.: US 6,991,449 B1
(45) Date of Patent: Jan. 31, 2006

(54) HEATING APPARATUS FOR IN-SITU DE-BULKING COMPOSITE PARTS DURING LAYUP

(75) Inventors: William T. Mead, Long Beach, CA (US); John Potter, Camaarillo, CA (US); Tom Hurka, Whittier, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 333 days.

(21) Appl. No.: 10/412,375

(22) Filed: Apr. 11, 2003

(51) Int. Cl.
*B29C 43/56* (2006.01)

(52) U.S. Cl. .................. 425/389; 425/405.1; 425/504; 156/382; 156/286

(58) Field of Classification Search ................ 425/389, 425/405.1; 156/382
See application file for complete search history.

(56) References Cited

U.S. PATENT DOCUMENTS

| | | | | |
|---|---|---|---|---|
| 3,652,380 A * | 3/1972 | Strack | ..................... | 428/356 |
| 3,837,965 A * | 9/1974 | Mahon et al. | ............. | 156/382 |
| 4,201,823 A * | 5/1980 | Russell | ..................... | 428/194 |
| 4,312,829 A * | 1/1982 | Fourcher | ................... | 264/571 |
| 4,357,193 A * | 11/1982 | McGann et al. | ............ | 156/286 |
| 4,492,607 A * | 1/1985 | Halcomb | .................... | 156/242 |
| 4,681,651 A * | 7/1987 | Brozovic et al. | .......... | 156/382 |
| 4,842,670 A | 6/1989 | Callis et al. | ............... | 156/382 |
| 4,942,013 A * | 7/1990 | Palmer et al. | .............. | 264/511 |
| 5,052,906 A * | 10/1991 | Seemann | .................... | 425/112 |
| 5,052,923 A | 10/1991 | Peter et al. | ................. | 432/205 |
| 5,087,193 A * | 2/1992 | Herbert, Jr. | ................ | 425/543 |
| 5,116,216 A * | 5/1992 | Cochran et al. | ........... | 425/504 |
| 5,152,949 A * | 10/1992 | Leoni et al. | ................ | 264/257 |
| 5,204,042 A * | 4/1993 | James et al. | ................ | 264/257 |
| 5,236,646 A * | 8/1993 | Cochran et al. | ............ | 264/102 |
| 5,281,388 A * | 1/1994 | Palmer et al. | .............. | 264/571 |
| 5,322,665 A * | 6/1994 | Bernardon et al. | ......... | 264/571 |
| 5,425,628 A * | 6/1995 | Pinckney et al. | ........... | 425/389 |
| 5,442,156 A * | 8/1995 | Westerman et al. | ........ | 219/243 |
| 5,492,466 A * | 2/1996 | Frailey | ....................... | 425/389 |
| 5,567,381 A | 10/1996 | Carter | ........................ | 266/250 |
| 5,591,369 A * | 1/1997 | Matsen et al. | ............. | 219/633 |
| 5,591,370 A * | 1/1997 | Matsen et al. | ............. | 219/645 |
| 5,702,663 A * | 12/1997 | Seemann | .................... | 264/510 |
| 5,814,175 A * | 9/1998 | Rau et al. | ................... | 156/157 |
| 5,863,452 A * | 1/1999 | Harshberger et al. | ........ | 249/83 |
| 6,017,484 A * | 1/2000 | Hale | ........................... | 264/510 |
| 6,018,614 A | 1/2000 | Garcia et al. | ............... | 392/383 |
| 6,159,414 A * | 12/2000 | Tunis et al. | ................ | 264/510 |
| 6,406,659 B1 * | 6/2002 | Lang et al. | ................ | 264/510 |
| 6,497,786 B1 * | 12/2002 | Kilgore et al. | ........... | 156/379.8 |
| 2003/0011104 A1 * | 1/2003 | Hock et al. | ................ | 264/316 |
| 2003/0025231 A1 * | 2/2003 | Slaughter et al. | ........... | 264/102 |

* cited by examiner

*Primary Examiner*—Robert Davis
*Assistant Examiner*—G. Nagesh Rao
(74) *Attorney, Agent, or Firm*—Louis L. Dachs

(57) ABSTRACT

The invention is an apparatus for de-bulking a composite material preform laid up in a mold. In detail, the apparatus includes a flexible cover adapted to fit over the mold and preform and attach to the sides of the mold. The cover includes an inlet port located in the cover such that when the cover is fit over the mold and preform, the inlet port positioned over the preform. A stretchable cord seals the peripheral portions of the cover to the sides of the mold forming a chamber over the preform. A hot air pump is coupled to the inlet port of the cover for pumping hot air into the chamber.

7 Claims, 4 Drawing Sheets

HEATING APPARATUS FOR IN-SITU DE-BULKING COMPOSITE PARTS DURING LAYUP

BACKGROUND OF THE INVENTION

1. Field of the Invention

The invention relates to the field of composite structure fabrication, in particular, to an improved system for de-bulking the uncured composite sheets as they are laid up in a mold at the workstation.

2. Description of Related Art

Typically, composite structures are formed by a process that involves the following steps:
1. Sheets of filamentary material impregnated with uncured resin are laid up in a mold having the contour of the completed part.
2. After the lay-up is complete, the lay-up is vacuum bagged.
3. Thereafter a vacuum is pulled between the lay-up and mold.
4. The vacuum-bagged lay-up is then placed in an autoclave wherein the temperature is increased to the curing temperature of the resin and the autoclave is pressured until the resin is cured.
5. Thereafter, the cured lay-up and mold are removed from the oven or autoclave and the now cured part is removed from the mold.

However, often the number of plies in the lay-up requires multiple de-bulks during the lay-up process that a de-bulking procedure is required. Typically, the lay-up process requires a de-bulk after a certain number of plies of resin impregnated filamentary material have been laid up in the mold. The partially completed lay-up has to be vacuum bagged and a vacuum pulled in order to de-gas and consolidate it if this is not done, there is a high probability that the completed part will have unacceptable voids caused by air pockets. It is preferred that this de-bulking process take place at a temperature at which the resin will flow but not readily cure. Thus the mold with vacuum-bagged partially completed lay-up must be moved into the autoclave. If the part is vary large, thus requiring a large and heavy mold, the process and be difficult and time consuming.

Portable oven and autoclave type devices are available. For example, U.S. Pat. No. 5,116,216 "Apparatus For Preparing Thermoplastic Composites" by R. C. Cochran, et al. discloses an apparatus for fabricating composites using thermoplastic matrix materials. A blanket heater is placed over the lay-up is used to supply the necessary heating. An inner flexible vacuum bag is placed over the lay-up and sealed to the mold surface and a ridged outer chamber is placed over the flexible vacuum bag and also sealed to the mold surface. A differential vacuum is drawn from between the flexible vacuum bag and lay-up and between the vacuum bag and ridged outer chamber, with the higher vacuum drawn from under the flexible vacuum bag. The blanket heater is turned on and the lay-up heated until the thermoplastic material has melted. Thereafter, the lay-up is allowed to cool to ambient conditions. The problem with this apparatus is that, its advantage of portability is diminished if the part being formed is large. Secondly, if high compaction pressures were required, an autoclave would still be necessary, even if the apparatus was used for de-bulking. Further the heater system and rigid chamber is part specific and must be fabricated for each tool and lay-up.

Thus, it is a primary object of the invention to provide to provide a de-bulking system for the manufacture of composite parts that does not require the partially completed lay-up and mold to be placed in an autoclave.

It is another primary object of the invention to provide a de-bulking system for the manufacture of composite parts that is easily transportable.

It is a further object of the invention to provide a de-bulking system for the manufacture of composite parts that is inexpensive to manufacture and is can be easily adapted to various size parts.

SUMMARY OF THE INVENTION

The invention is an apparatus for de-bulking a composite material preform laid up in a mold. In detail, the apparatus includes a flexible cover having a center portion to fit over the mold and preform and a peripheral portion for attaching to the sides of mold. The cover has an inlet port located in the cover such that when the cover is fit over the mold and preform, the inlet is positioned over the preform. Preferably, the cover includes a perforated sheet such that when the cover is installed, the sheet separates the inlet port from the preform. This perforated sheet insures that the hot air is distributed uniformly over the preform.

A sealing assembly is provided for sealing the peripheral portion of the cover to the sides of the mold forming a chamber over the preform. The sealing assembly is preferably a stretchable cord tied about the peripheral edge of the cover securing the cover to the sides of the mold. A hot air pump has its output port coupled to the inlet port of the cover. Preferably, the pump produces heated air a sufficient pressure to cause the stretchable cord to expand allowing heated air to escape from the chamber.

In another embodiment, the peripheral side portion extends beyond the sealing assembly and the edge of peripheral side portion is secured to the mold to form a second chamber extending about the mold. Alternately, the edge extends to the floor upon which the mold rests also forming a second chamber about the mold. In either instance the second chamber includes an outlet port which is coupled to the inlet port of the pump. Thus hot air can be re-circulated improving heating efficiency.

During lay-up of the preform, the process is periodically stopped and the partially completed preform is vacuum bagged and the apparatus installed. A vacuum is pulled from between the vacuum bag and mold, in-situ heated air is applied causing the preform to heat of a temperature that drives off any entrapped gases. After a sufficient time has passed insuring that all entrapped gases have been removed, the apparatus is removed and along with the vacuum bag and the lay-up process continues.

The novel features which are believed to be characteristic of the invention, both as to its organization and method of operation, together with further objects and advantages thereof, will be better understood from the following description in connection with the accompanying drawings in which the presently preferred embodiments of the invention are illustrated by way of example. It is to be expressly understood, however, that the drawings are for purposes of illustration and description only and are not intended as a definition of the limits of the invention.

BRIEF DESCRIPTION OF THE DRAWINGS

FIG. 2 is a cross-sectional view of the molding apparatus shown in FIG. 1 with a first embodiment of the invention installed there on.

FIG. 3 is a cross-sectional view of the molding apparatus shown in FIG. 1 with a second embodiment of the invention installed there on.

DESCRIPTION OF THE PREFERRED EMBODIMENT

Figure 1:
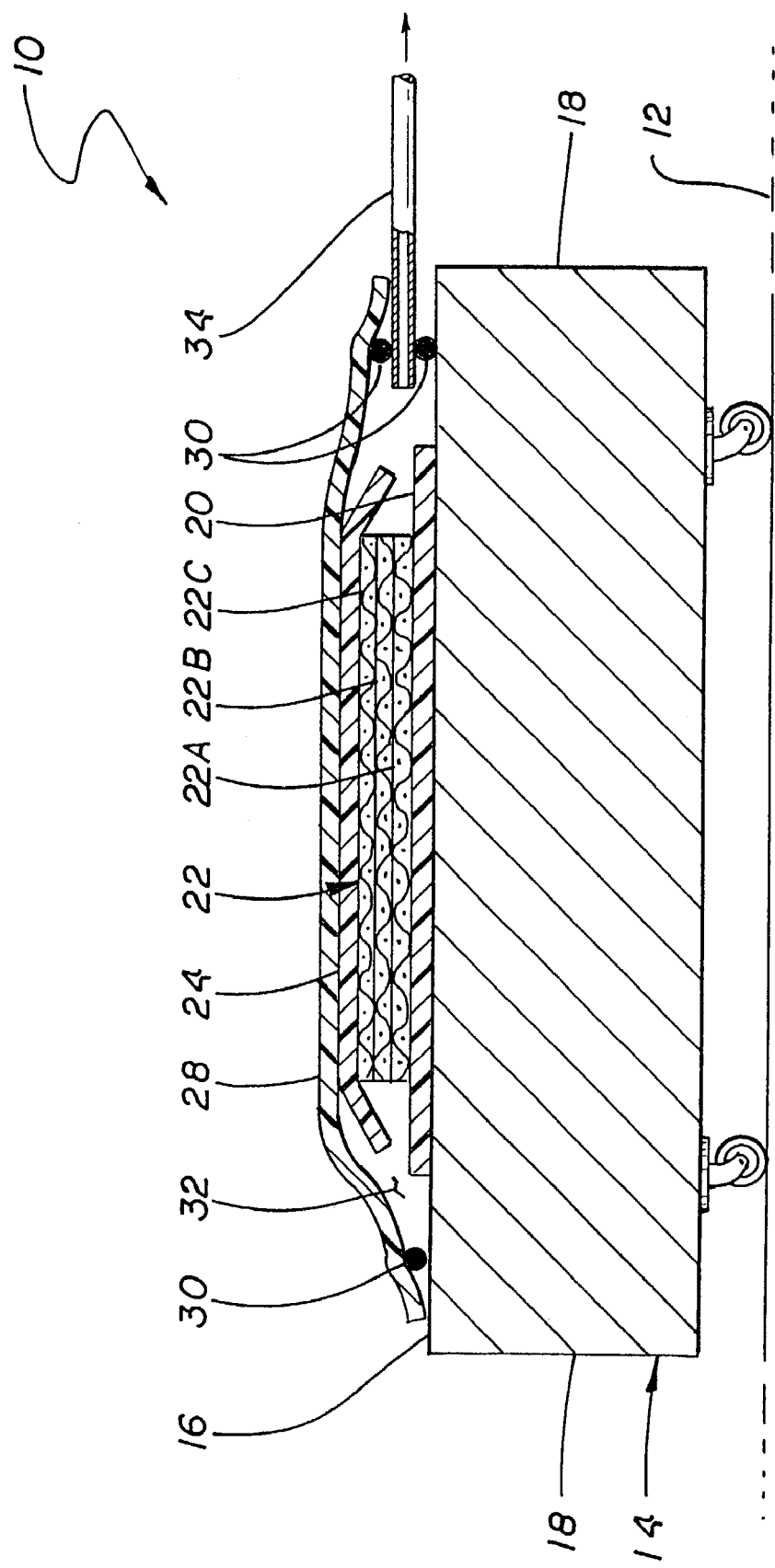
FIG. 1 is a cross-sectional view of a molding apparatus for the manufacture of composite parts.

A typical composite fabrication tool is illustrated in FIG. 1 and generally indicated by numeral 10, resting on the floor 12. It includes a mold 14 having a mold surface 16 and side surfaces 18. The molding surface 16 for purposes of illustration is flat, however, it could, and in most cases would have a complex contour. A release agent 20 is first positioned on the surface 16. Thereafter, individual plies of pre-impregnated cloth and resin, for example and epoxy impregnated filamentary material is laid up over the release agent 20 on mold surface 16 to form preform 22. The individual plies could comprise woven material or could be unidirectional plies laid up at plus and minus 90 degrees as well as plus or minus 45 degrees. For purposes of illustration the preform 22 is laid up in three sections 22A, 22B and 22C. After the preform 22 is complete, a release film 24 is placed there over. Finally, an impervious flexible vacuum bag 28, typically made of nylon or a Silicone based material is placed over the release agent 20 and release film 24 and preform 22 and sealed to the molding surface 16 by means of sealant tape 30 forming a chamber 32. A vacuum line 34 is provided for drawing a vacuum from the chamber 32.

A vacuum is applied to consolidate and remove entrapped gases from preform 22. The completed assembly is then moved into an autoclave (not shown) wherein the temperature and pressure are raised, while a vacuum is drawn from the chamber 32. This will cause the resin within the preform 22 to melt and cure, while consolidating the preform into its final shape. The temperature and pressure are then reduced to ambient and the mold 14 is removed from the autoclave and the now finished part removed therefrom. While the above process has been simplified for purposes of illustration, it does present the basics of composite manufacture.

One of the problems that may occur, especially if the preform 22 is made up of a large number of plies, is entrapped gases that will expand during heating may cause voids to be formed in the completed part, greatly reducing its strength. To eliminate this possibility, the prior art method of de-bulking was to only partially complete the preform 22 on the molding surface 16 of the mold 14 and place the assembly in the autoclave. For example section 22A. The temperature was raised, to a temperature well below the curing temperature of the resin, while vacuum was drawn from the chamber 32. This allowed any entrapped gases to be removed. This process would be repeated several times, depending upon the complexity of the preform. If the part being formed was large, requiring a corresponding large and heavy tool, the process of de-bulking was time consuming and expensive. The subject invention eliminated this problem.

Figure 2:
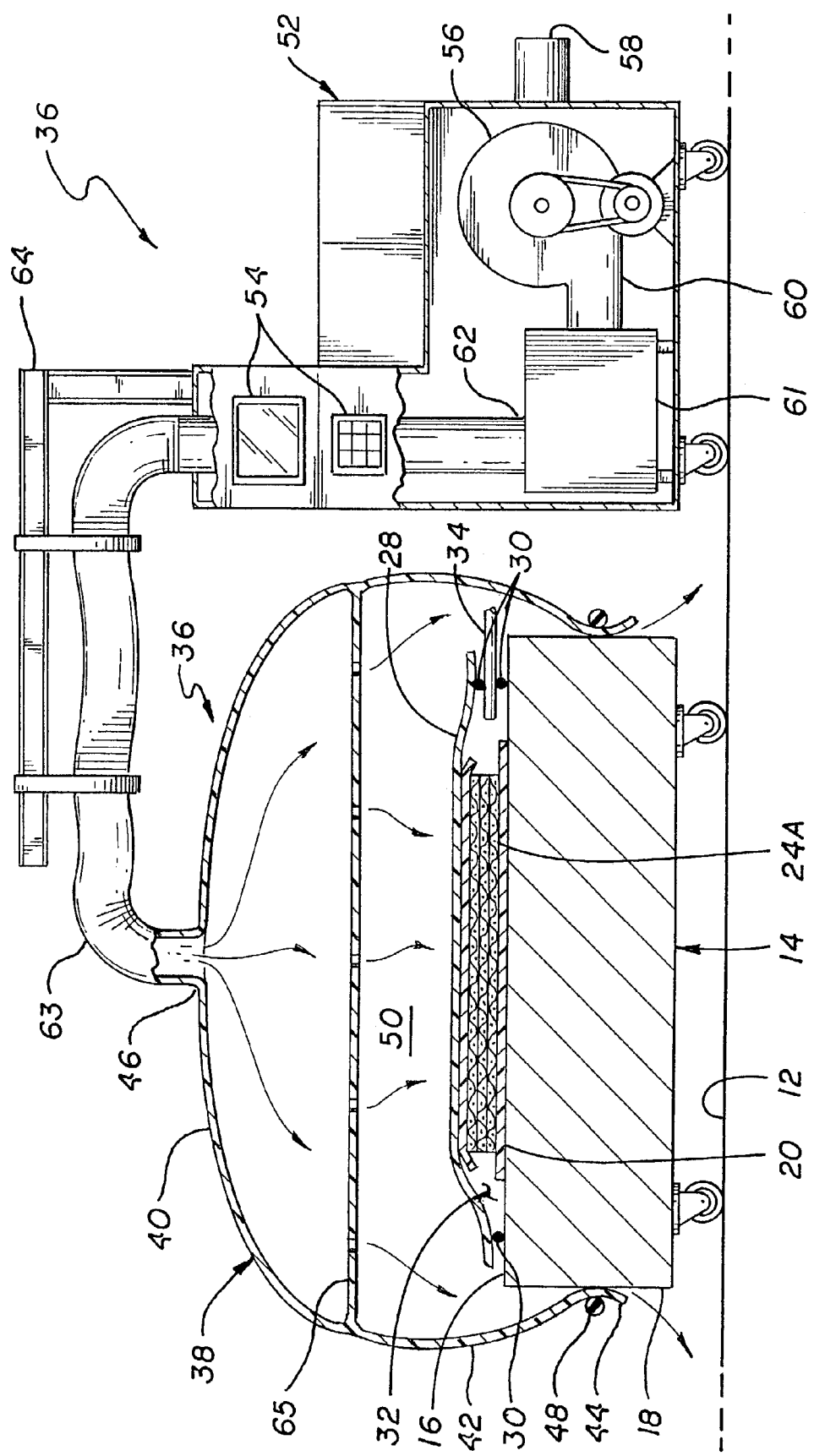

Referring to FIG. 2, the subject invention is a portable in-situ heating apparatus, generally designated by numeral 36, to accomplish de-bulking of the preform as it is assembled. After preform section 22A has been assembled on the mold surface 16, the apparatus 36 bought to the mold 14. The apparatus 36 includes a flexible cover 38, preferably made of a lightweight Nylon cloth, comprising a center portion 40 for extending over the mold surface 16 and preform section 22A. The cover 38 also includes a peripheral side portion 42 having an peripheral edge 44, which is configured to fit about the side surfaces 18. The cover 38 further includes and inlet port 46 positioned in the center portion 40. The cover is secured to the mold 12 by means of a stretchable cord (bungee cord) 48 that secures the peripheral side portion 42 of the cover 38 to the side surfaces 18 of the mold 14. Thus a chamber 50 is created over the mold surface 16. A suitable cover material is NYLON®, manufactured by the E. I. duPont de Nemours & Company, Delaware. Preferably, Diamond Rip Stop Fabric using Type 6,6 NYLON®, coated with urethane manufactured by Astrostar International Incorporated, Sioux Falls, S. Dak. I The apparatus 36 further includes a portable platform 52 containing a control panel 54. The platform 52 includes an air pump 56, having an inlet port 58 and outlet port 60. The outlet port 60 is coupled to a heater assembly 61. The heater assembly 61 includes an outlet port 62 that is coupled to inlet port 46 in the cover 38 via a tube 63. The tube 63 is supported by an over head support beam assembly 64. Thus in operation, after preform section 22A of the preform 22 has been assembled and vacuum bagged and the cover 38 installed as illustrated, the pump 56 is turned on. Heated air enters the chamber 50 and heats the partially assembled preform 22A, to cause any entrapped gases to be expelled and drawn off therefrom.

The temperature of the heated air is maintained at a level well below the curing temperature of the resin. The heated air passes over the mold surface 16 and around the side surfaces 18. Note that the pump 56 is designed to produce sufficient pressure to inflate the flexible cover 38 and forces air pass the bungee cord 48. This insures that hot air at the required temperature is maintained over the preform section 22A. Additionally, the center portion 40 includes a perforated partition 65, which will further insure that hot air is evenly distributed over preform section 22A. After de-bulking of preform section 22A has been accomplished the pump 56 is turned off, the cover 38 removed as well as the vacuum bag 28. Thereafter addition layers of filamentary material is added to the partially assembled preform and the de-bulking process is repeated.

Figure 3:
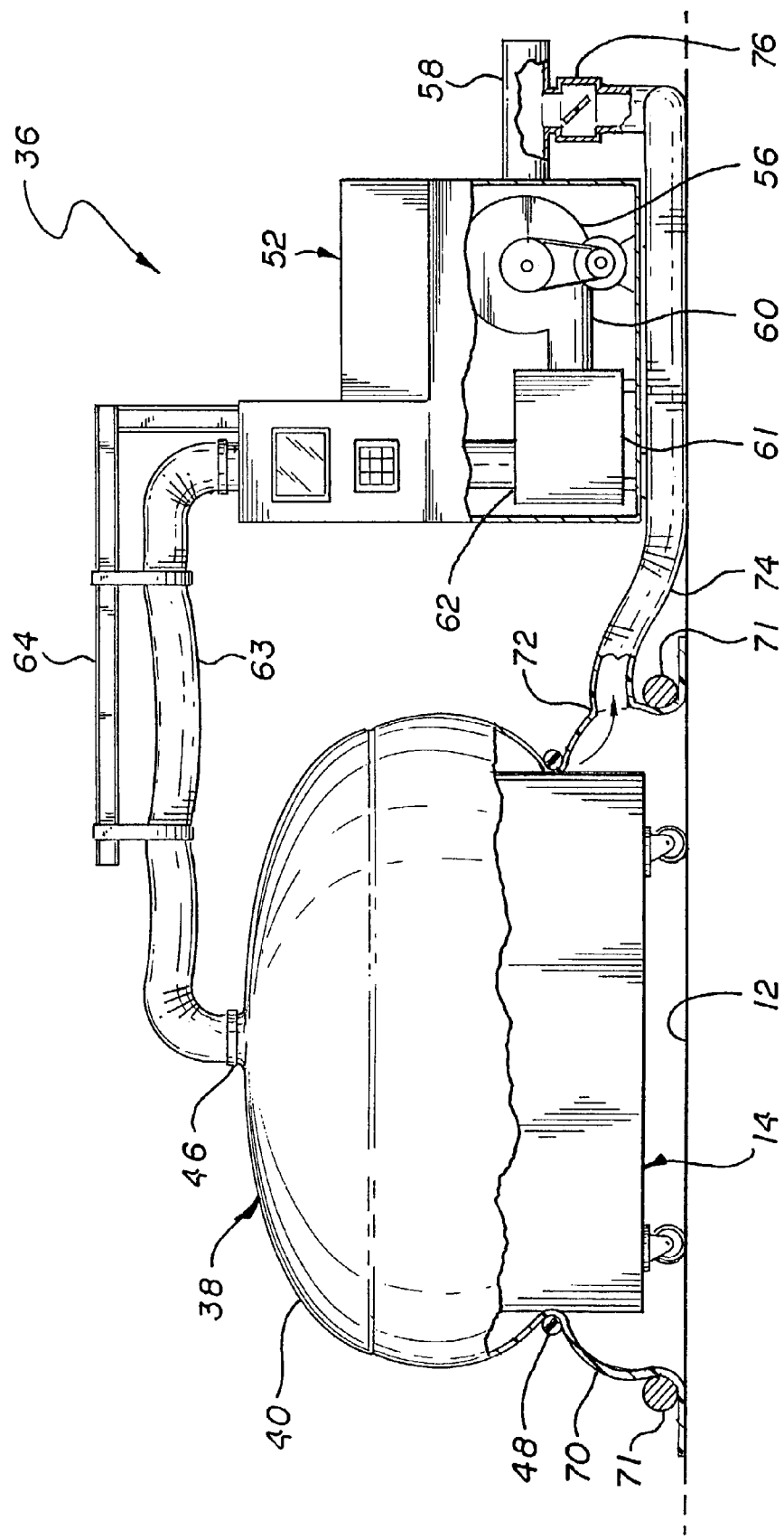
Figure 4:
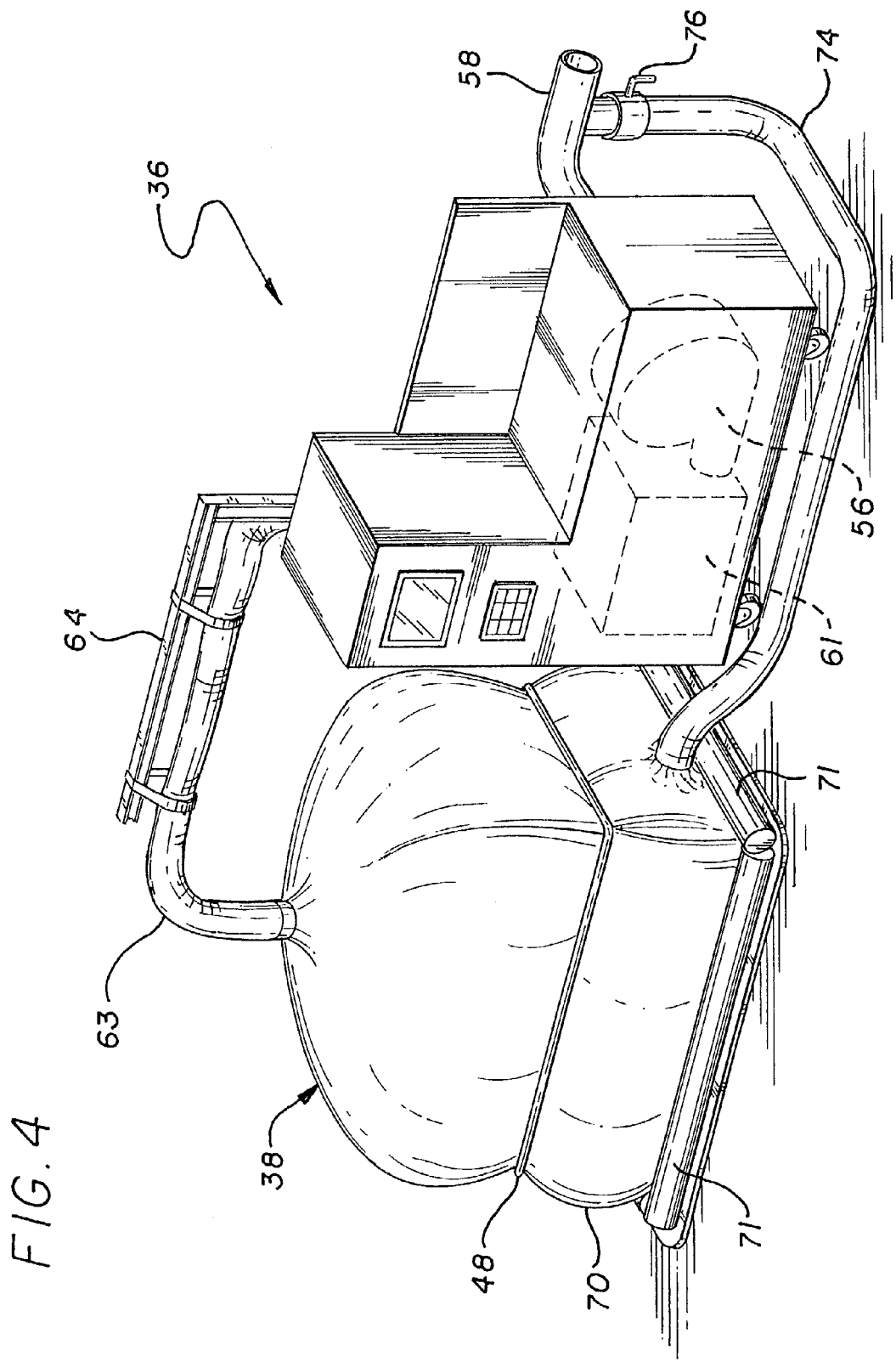
FIG. 4 is a perspective view of the molding apparatus and second embodiment of the invention shown in FIG. 3

In FIGS. 3 and 4 a second embodiment of the apparatus is illustrated. In this embodiment the peripheral side portion 42 extends passed the stretchable cord 48 and the peripheral edge 44 is either sealed to the floor 12 or the side portion 18 of the mold 14 forming a peripheral plenum 70. Sealing can be accomplished by a second stretchable cord (not shown) or weights 71, which seal the plenum 70 to the floor 12. An outlet port 72 is provided in the plenum 70 that is coupled to the inlet port 58 of the pump 56 via a duct 74. A Valve 76, preferably a butterfly valve, is mounted in the duct 74 in proximity to the inlet port 58 of the pump 56. Thus heated air, now at a reduced temperature, that is expelled passed the stretchable cord 48 is recycled, improving efficiency. The valve 76 is adjusted to insure that the cover 38 is fully inflated and that heated air is circulated over the preform section 22A.

Thus it can be seen that the portable apparatus 36 can be used in place of an oven or autoclave for de-bulking of the preform, thus eliminating the time consuming task of moving a large mold and the expense of operating a large oven and resetting of the ply locater. The de-bulking process is used as many times as necessary. In the example provided this would include a de-bulking step after preform section 22B of the preform 22 was assembled. A cost benefit analysis has indicated that a significant cost saving is achieved.

While the invention has been described with reference to particular embodiments, it should be understood that the embodiments of merely illustrative as there are numerous variations and modifications, which may be made by those skilled in the art. Thus, the invention is to be construed as being limited only by the spirit and scope of the appended claims.

INDUSTRIAL APPLICABILITY

The invention has applicability to industries manufacturing composite structures.

What is claimed is:

1. An apparatus for de-bulking a composite material preform laid up in a mold, the apparatus comprising:
   a vacuum bag adapted to seal said perform to said mold, said vacuum bag having means for drawing a vacuum from between said vacuum bag and the mold;
   a flexible cover adapted to fit over the mold, vacuum bag and preform and attach to the sides of mold, said cover having an inlet port located in the cover such that when the cover is fitted over the mold, and said vacuum bag and preform, said inlet port is positioned over the preform;
   sealing means for sealing the peripheral portions of said cover to the sides of the mold forming a chamber over the preform and vacuum bag; and
   pump means having an inlet and an outlet coupled to the inlet port of said cover, said pump means for pumping heated air into said chamber, said pump means including:
      a pump; and
      a heater coupled to said pump.

2. The apparatus as set forth in claim 1 wherein said sealing means is a stretchable cord tied about said peripheral edge of said cover securing said cover to the sides of the mold.

3. The apparatus as set forth in claim 2 wherein:
   said pump means is adapted to provide heated air at a specific pressure to cause said flexible cover to inflate; and
   said stretchable cord adapted to stretch sufficiently to allow heated air to escape from said chamber when said pump means provides the heated air at the specific pressure.

4. The apparatus as set forth in claim 3 wherein:
   said stretchable cord secures said peripheral side portion of said cover to the mold at a specific distance from the edge of said peripheral side portion and said edge is secured to the mold forming a plenum chamber about the periphery of the mold;
   an tubular member having a first end in communication with said plenum and a second end in communication with said inlet of said pump means;
   such that heated air pumped into said cover and flowing passed said stretchable cord into said plenum is recirculated to said pump means.

5. An apparatus for de-bulking a vacuum-bagged composite material preform laid up on an upper surface of a mold, the apparatus comprising:
   a flexible cover having a center portion having an inlet port and a peripheral side portion terminating in a peripheral edge, said center portion of said cover adapted to fit over the upper surface of the mold and vacuum bagged preform, said peripheral side portion adapted to fit about the sides of the mold;
   first sealing means for sealing the peripheral portion at a point between said center portion and said peripheral edge of said cover to the sides of the mold forming a chamber over the upper surface with the vacuum bagged preform thereon;
   second sealing means for sealing said peripheral edge to the sides of the mold or the floor forming a plenum about the side of the mold; and
   an air pump having an inlet port and an outlet port;
   a heater having an inlet coupled to said outlet of said air pump, said heater having an outlet coupled to said inlet of said cover;
   a duct having a first end coupled to said plenum and a second end coupled to said outlet port of said air pump; and
   a valve mounted in said second end of said duct for modulating the flow of air from said plenum to said inlet port of said air pump.

6. The apparatus as set forth in claim 5 wherein said first sealing means is a stretchable cord tied about said peripheral portion said cover.

7. The apparatus as set forth in claim 6 wherein:
   said pump means is adapted to provide heated air at a specific pressure to cause said flexible cover to inflate; and
   said stretchable cord adapted to stretch sufficiently to allow heated air to escape from said chamber when said pump means provides the heated air at the specific pressure.

* * * * *